United States Patent [19]
Tanaka et al.

[11] Patent Number: 5,230,665
[45] Date of Patent: Jul. 27, 1993

[54] DRIVING FORCE TRANSMISSION APPARATUS, METHOD FOR PRODUCING THE SAME, AND EXTENDIBLE STRUCTURE THEREWITH

[75] Inventors: Arata Tanaka, Yokohama; Kenichi Takahara, Tokyo, both of Japan

[73] Assignee: Kabushiki Kaisha Toshiba, Kawasaki, Japan

[21] Appl. No.: 893,051

[22] Filed: Jun. 3, 1992

[30] Foreign Application Priority Data

Jun. 4, 1991 [JP] Japan ............................. 3-132945

[51] Int. Cl.⁵ .............................................. F16G 9/00
[52] U.S. Cl. .................................... 474/153; 474/154
[58] Field of Search ................... 474/153, 154, 84–87

[56] References Cited

U.S. PATENT DOCUMENTS

| | | | |
|---|---|---|---|
| 3,498,148 | 3/1970 | Gerbasi et al. | 474/154 |
| 4,424,619 | 1/1984 | Conrad | 474/154 X |
| 4,864,784 | 9/1989 | Binge et al. | |

FOREIGN PATENT DOCUMENTS 61-16686  5/1986  Japan.
62-268857 11/1987  Japan.

OTHER PUBLICATIONS

IAAA 90-1054, pp. 1–6, 1990, T. Kitamura, et al., "Development of a High Stiffness Extendible and Retractable Mast 'Himat' for Space Applications".

*Primary Examiner*—Thuy M. Bui
*Attorney, Agent, or Firm*—Oblon, Spivak, McClelland, Maier & Neustadt

[57] ABSTRACT

A light driving force transmission apparatus performs driving force transmission without the use of friction and with high lubrication, applicable, for example, in a space environment. A plurality of connection members are secured to an endless rope to form a ball chain. The ball chain is stretched between a pair of sprockets each of which has on the periphery thereof a guide groove for guiding the endless rope and recesses engageable with the connection members. Driving shafts and driven shafts of at least two sprocket pairs are respectively coaxially located. A connecting rod is bridged between the endless ropes by securing the two ends thereof to two opposed connection members. The driving shafts of the sprocket pairs are rotated to cause a specific rotational reciprocating motion of the connecting rod so as to move a hook member of an object in a desired direction.

17 Claims, 8 Drawing Sheets

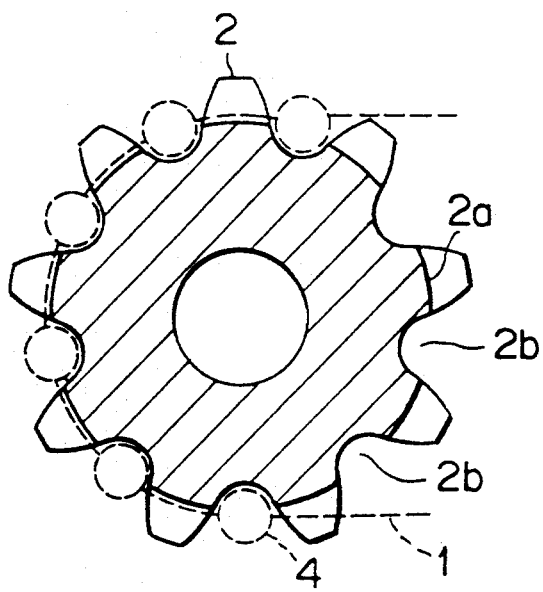
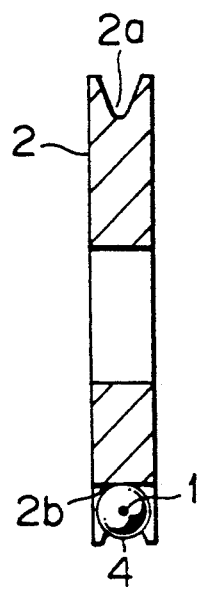
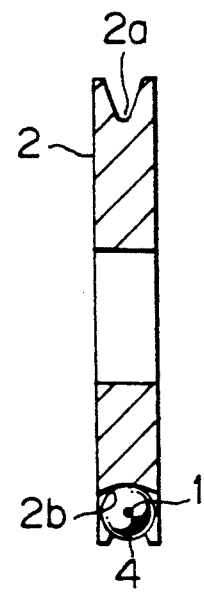
FIG. 2A     FIG. 2B     FIG. 2C
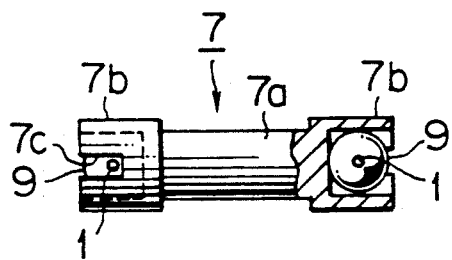
FIG. 3A
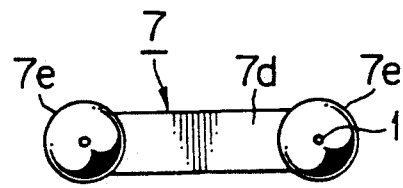
FIG. 3B

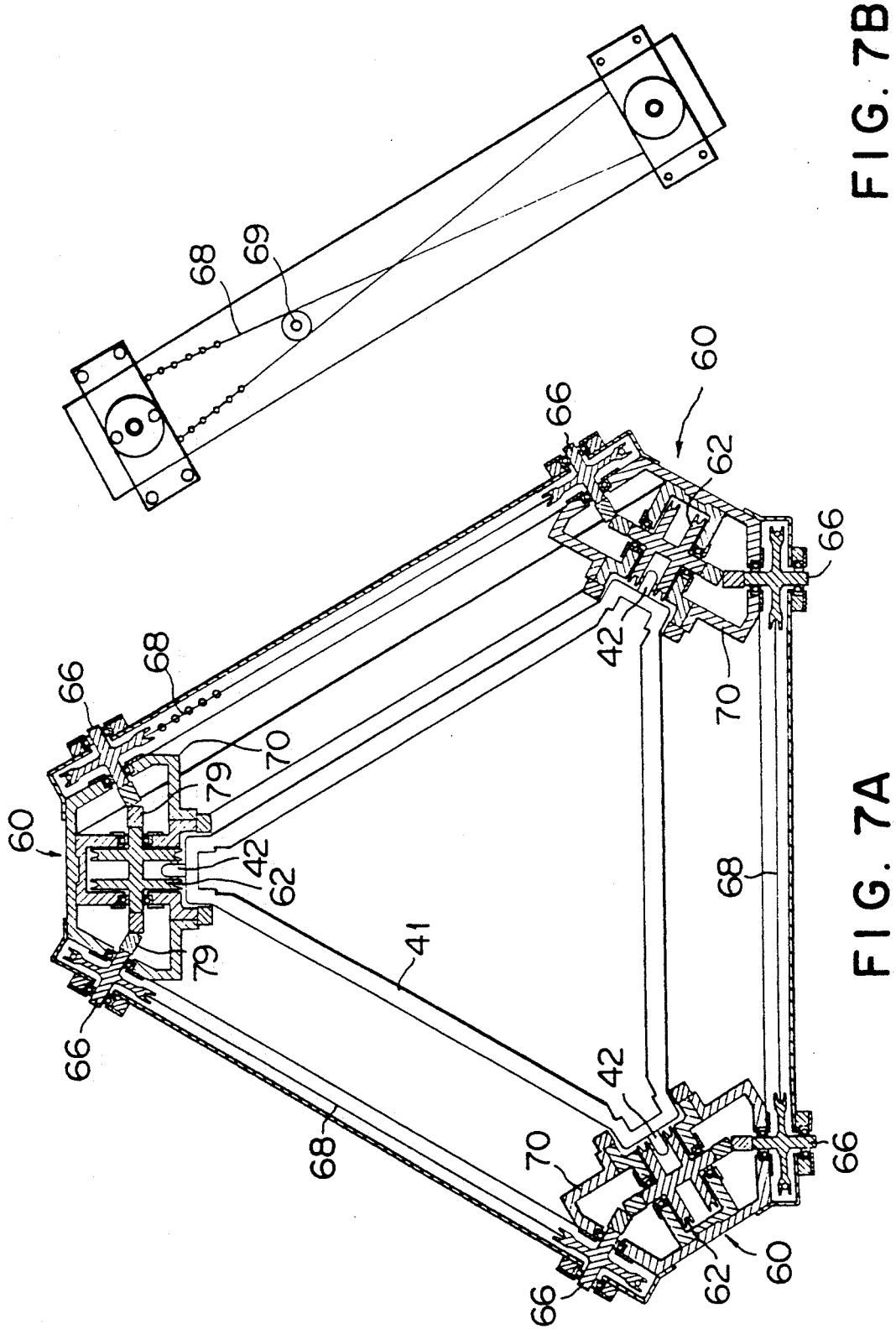

DRIVING FORCE TRANSMISSION APPARATUS, METHOD FOR PRODUCING THE SAME, AND EXTENDIBLE STRUCTURE THEREWITH

BACKGROUND OF THE INVENTION

1. Field of the Invention

The present invention relates to a driving force transmission apparatus, a method for producing this apparatus, and an extendible structure with the driving force transmission apparatus. More particularly, the present invention relates to a light driving force transmission apparatus which may transmit a driving force without use of friction and with high lubrication, to a method for producing this light driving force transmission apparatus, and to an extendible structure provided with this light driving force transmission apparatus applicable for example in space environment.

2. Description of the Related Background Art

As driving force transmission means for transmitting a driving force, transmission wheels of driving and driven wheels directly contacting each other and sprocket wheels or belt wheels transmitting a driving force through a chain or a belt are known.

The driving force transmission by the chain and sprockets requires periodical supply of grease or lubricant upon maintenance of apparatus to maintain lubrication of contacting portions. The driving force transmission by the wire rope and pulleys requires holding of proper friction because the driving force is transmitted from the pulley to the wire through a frictional force between the parts.

If such driving force transmission apparatus is used in space environment, lubrication becomes a great problem. For example, the sprockets cannot be dipped in a lubricant in vacuum, and it is also difficult to maintain the wire rope in a proper stretch state, which makes a sufficient friction unobtainable.

A so-called ball chain has been proposed, in which beads or balls of resin are attached as connection members at a predetermined pitch onto a wire rope, and in which sprockets are provided with recesses connected to the connecting members of beads or balls. Reference is made regarding to such ball chains to Japanese Unexamined Patent Publication Sho 62-268857 and Japanese Examined Patent Publication Sho 61-16686. Such a ball chain enables rotation at a uniform rate to assure a proper frictional force without fine adjustment of the chain tension.

However, the above-described ball chain is intended to accurately transmit rotation of a driving wheel to a driven wheel, but not to transfer an object utilizing the rotation of ball chain. Thus the ball chain cannot be used as a transfer mechanism.

The balls must be positioned with high precision on the ball chain in order to accurately rotate the ball chain. It is in general known that the precision is poor for attachment of ball connection members to the wire rope. More specifically, the ball chain is obtained by consecutive caulking of caulking members which are positioned at specific positions starting from one end to the other end of the wire rope. The caulking is carried out after measurement of the position from a preceding caulking member already caulked on the wire rope. Such measurement and caulking are repeated one by one on the wire rope. Therefore, it is tedious and complex to complete the caulking of all caulking members on the wire rope. In addition, the precision of the ball chain is lowered by accumulation of dimensional errors between the caulking members.

An application of such a driving force transmission apparatus is used in space environment. There is proposed an extendible structure which expands and supports in space an antenna reflector or a solar battery paddle stored in a part of space station (see 31ST AIAA/ASME/ASCE/AHS/ASC Structures, Structural Dynamics and Materials Conference, AIAA-90-1054, Development of a High Stiffness Extendible and Retractable Mast 'HIMAT' for Space Applications).

The extendible structure provides a complete structure system by extending a mast of truss structure stored in a canister by means of a raising drive mechanism. In order to extend such a conventional extendible structure, projections are provided at apexes of a truss structure member to be moved in a specific direction by using the rotation of rotating grooves of screw jacks in the raising drive mechanism.

The rotation of a motor is distributed to the respective screw jacks in the raising drive mechanism by a timing belt to drive them, creating a problem of complicated structure.

Further, since the screw jack itself is considerably heavy, the weight of extendible structure inevitably increases, which is fatal for a space station most importantly requiring weight reduction.

SUMMARY OF THE INVENTION

It is, therefore, an object of the present invention to provide a driving force transmission apparatus in a light and simple structure with high lubrication to operate reliably in a space environment, thereby solving the above-described problems inherent in the prior art. The present invention has achieved the above object by a driving force transmission apparatus comprising at least two units, each of which comprises: an endless rope belt on which a plurality of connection members are secured at a specific pitch; and a pair of sprockets each having on a periphery thereof a guide groove for guiding the endless rope belt and recesses connectable with the connection members; wherein driving shafts and driven shafts of at least two sprocket pairs are respectively coaxially located; a connecting rod is adapted to form a bridge between the endless ropes by securing both ends thereof to the connection members; and the driving shafts of the sprocket pairs are rotated to cause a specific rotational reciprocating motion of the connecting rod.

The present invention is also featured by a method for producing a driving force transmission apparatus as described above, comprising: a provisional stop step of: running a rope with a predetermined tension through a plurality of caulking members each with a through hole; setting the rope and caulking members on a template having recesses formed thereon at a specific pitch; and provisionally stopping the caulking members on the rope while aligning caulking members with the recesses; a final stop step of further caulking the caulking members provisionally stopped, on the rope; and a step of connecting both ends of the rope by a caulking member to obtain an endless rope.

Further, the present invention is featured by an extendible structure in which a structure assembly member stored in a specific bent condition is to be extended by a driving force transmission apparatus as described above to construct a complete structure system.

According to the present invention, the driving force transmission may be performed by a light and simple structure full of lubrication and independent of frictional force, because the driving force transmission apparatus comprises at least two units, each of which comprises: an endless rope on which a plurality of connection members are secured at a specific pitch; and a pair of sprockets each having on the periphery thereof a guide groove for guiding the endless rope and recesses connectable with the connection members; wherein driving shafts and driven shafts of at least two sprocket pairs are respectively coaxially located; a connecting rod bridges between the endless ropes by securing both ends thereof to the connection members; and the driving shafts of the sprocket pairs are rotated to cause a specific rotational reciprocating motion of the connecting rod.

Also, according to the present invention, the connection members may be accurately positioned by the provisional caulking thereof by the template to obtain the rope with the connection members being secured thereon as a high precision driving force transmission member, because a method for producing a driving force transmission apparatus as described above, comprises: a provisional stop step of: running a rope with a predetermined tension through a plurality of caulking members with a through hole; setting the rope and caulking members on a template having recesses formed thereon at a specific pitch; and provisionally stopping the caulking members on the rope while aligning caulking members with the recesses; a final stop step of further caulking the caulking members provisionally stopped, on the rope; and a step of connecting both ends of the rope by a caulking member to obtain an endless rope.

Further, according to the present invention, the extendible structure may be used in various broadened applications in vacuum such as in a space environment, because, in an extendible structure, a structure assembly member stored in a specific bent condition is to be extended by a driving force transmission apparatus as described above to construct a complete structure system.

BRIEF DESCRIPTION OF THE DRAWINGS

FIGS. 2A-2C are sectional views showing examples of sprockets used in the driving force transmission apparatus as shown in FIG. 1;

FIGS. 3A and 3B are elevational views showing an example of a connecting rod used in the driving force transmission apparatus as shown in FIG. 1;

FIGS. 7A and 7B are sectional plan views showing an example of the raising drive mechanism of the extendible structure;

DESCRIPTION OF THE PREFERRED EMBODIMENTS

An embodiment of driving force transmission apparatus according to the present invention is described below with reference to the accompanying drawings.

Figure 1:
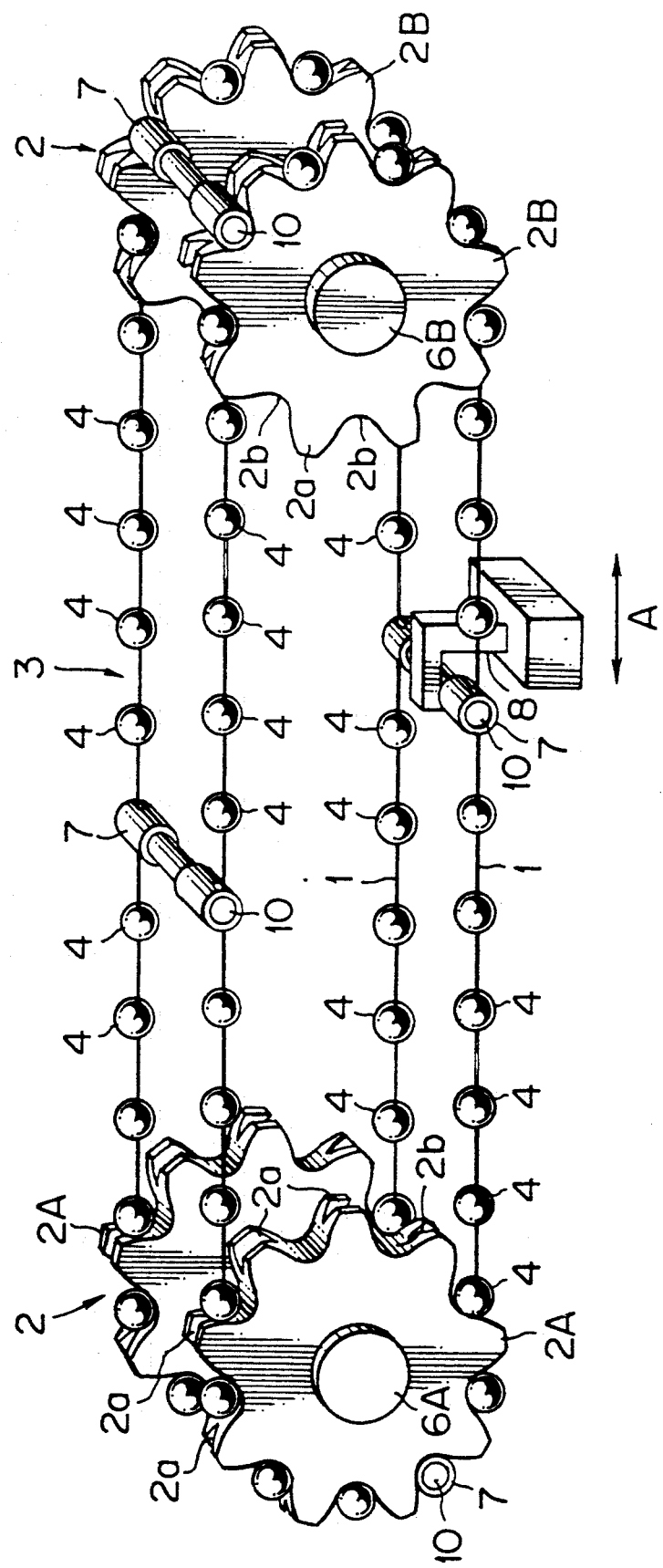
FIG. 1 is a perspective view showing an embodiment of the driving force transmission apparatus according to the present invention.
Figure 4A:
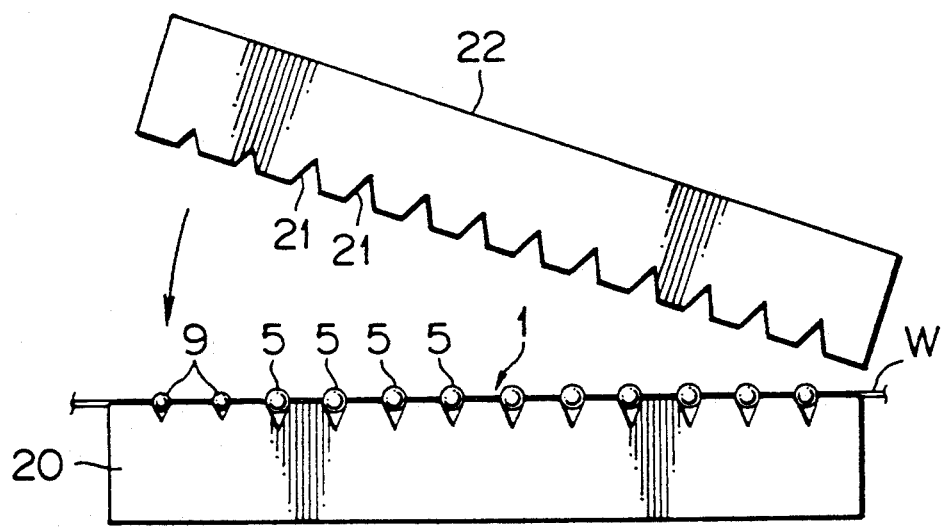
FIGS. 4A-4C are side views for a description of an example of the method for producing a ball chain according to the present invention.
Figure 4B:
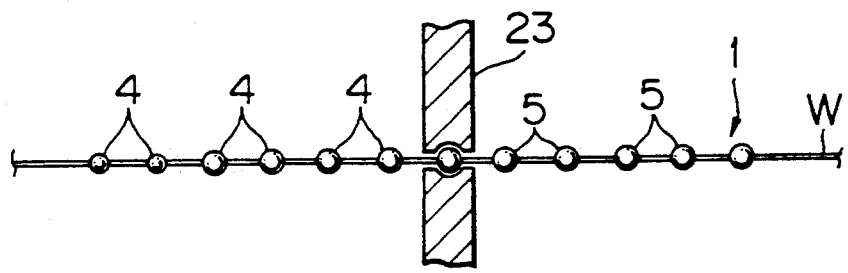
Figure 4C:
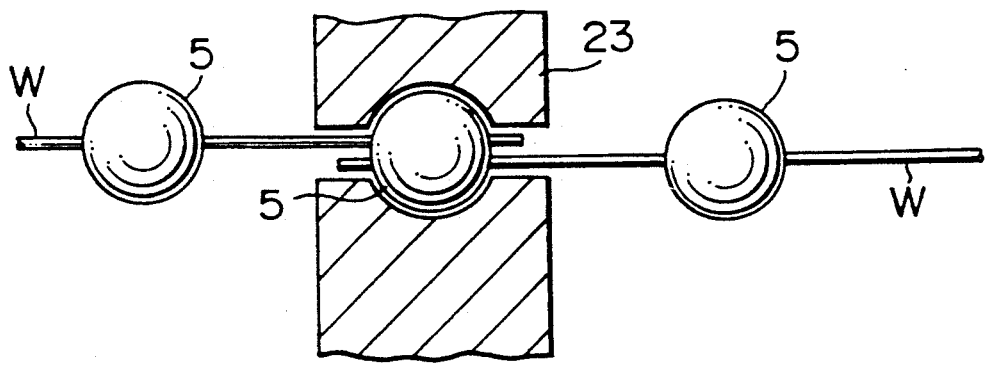

FIG. 1 shows a driving force transmission apparatus 3 which is composed of two sets of an endless rope 1 serving as a ball chain (hereinafter called a ball chain) and sprockets 2. A plurality of connection members 4 are secured at an equal pitch on the ball chain 1. The connection members 4 are formed by caulking caulking members 5 as shown in FIGS. 4A-4C onto the wire rope. The ball chain 1 is stretched between a pair of sprockets 2A and 2B, and is rotated by the rotation of a driving shaft 6A. Guide grooves 2a of V-shape are provided on the periphery of the sprockets 2 for guiding the ball chain 1. Further formed at an equal pitch are recesses 2b engageable with the connection members 4 of ball shape. Two ball chains 1 are stretched between the driving shaft 6A and driven shaft 6B of the paired sprockets 2A, 2B, which are coaxially positioned. The two ball chains are synchronously rotated with rotation of the driving shaft 6A. A connecting rod 7 forms a bridge between the two ball chains 1 such that the connecting rod 7 is secured at its ends to two connection members 4 facing each other on the two ball chains 1 at a specific spacing. When the driving shaft 6A of the sprocket 2 is rotated, the connecting rod 7 is moved rotationally and reciprocatively in a specific rotation direction. A hook 8 may be engaged with (hung on) the connecting rod 7 to be transferred at a specific speed in the direction of arrow A.

The following is a description of the essential structural elements of the above-described driving force transmission apparatus.

FIGS. 2A-2C show the sprocket 2, and FIG. 2A shows a section of the sprocket 2 perpendicular to the rotational shaft. The connection members 4 of the ball chain 1 are designed to fit into the recesses 2b of sprocket 2. The wire rope is guided in the guide groove 2a of V-shape of the sprocket 2.

FIGS. 2B and 2C show the shapes of the recess 2b of the sprocket, into which the connection members 4 of the ball chain 1 fit. FIG. 2(B) shows a flat bottom of the recess 2b. The bottom of recess 2b may be formed in a curved shape as shown in FIG. 2C to increase the contact area between the connection member 4 and the sprocket 2.

FIGS. 3A and 3B show two connecting rods 7. The connecting rod 7 as shown in FIG. 3A is comprised of a central cylinder 7a and receiving cylinders 7b provided at the two ends thereof. The receiving cylinders 7b have an outer diameter larger than that of the central cylinder 7a, but equal to that of connection member 4. Slits 7c are formed in the receiving cylinders 7b for passage of the ball chain 1 therethrough. A received member 9 is received in the receiving cylinder 7b. The received member 9 may be formed by caulking a caulking member 9 smaller than that of the other connection members 4. When the connecting rod 7 is attached to the ball chain 1, the receiving cylinders 7b are brought into a fit contact with the smaller received members 9 adjacent to each other on the respective ball chains to connect the ball chains thereby. Then a hook of an object to be transferred may be hung on the connecting rod 7 attached to the ball chains 1 to transfer the object. Since the outer diameter of the connecting rod 7 is equal to the diameter of the connection members 4, the connecting rod 7 fits into the recess 2b of the sprocket 2 to rotate therewith. The outer diameter of the central cylinder 7a of connecting rod 7 is determined not to interfere with any projection such as a hook of the moving object.

FIG. 3B shows another example of the connecting rod 7. Spherical ends 7e are provided on both ends of a central cylinder 7d. Small through holes are perforated at the center of the spherical ends for the passage of the ball chain 1. The central cylinder 7d is cylindrical with the same diameter as the central cylinder 7a of FIG. 3A, and the outer diameter of the spherical end 7e is equal to that of the connection members 4 not shown in FIG. 3(B).

A process for making the ball chain 1 is described below with reference to FIGS. 4A-4C.

The process for making the ball chain 1 comprises three serial steps, which include a provisional stop step as shown in FIG. 4A, a final stop step as shown in FIG 4B, and a terminal connecting step as shown in FIG. 4C. The provisional stop step includes running the wire rope W with a specific tension through a plurality of caulking members 5 each with a small through hole, setting the wire rope W and the caulking members 5, 9 on a template 20 with recesses 21 of V-shape at a specific pitch, and pressing another template 22 onto the template 20 to push the caulking members 5, 9 so as to carry out the provisional stop of caulking members 5, 9 at the respective positions of recesses 21 on the template 20. The final stop step includes setting the caulking members 5 one by one in a caulking device 23 after the provisional stop, and pressing the caulking members 5 one by one to effect the final stop on the wire rope W so as to form the almost spherical connection members. The terminal connecting step is connecting both ends of wire rope W by caulking another caulking member 5 t obtain the endless wire rope W. After such steps, the caulking members 5 are precisely positioned at an equal spacing on the wire rope W and readily secured thereon.

Figure 5:
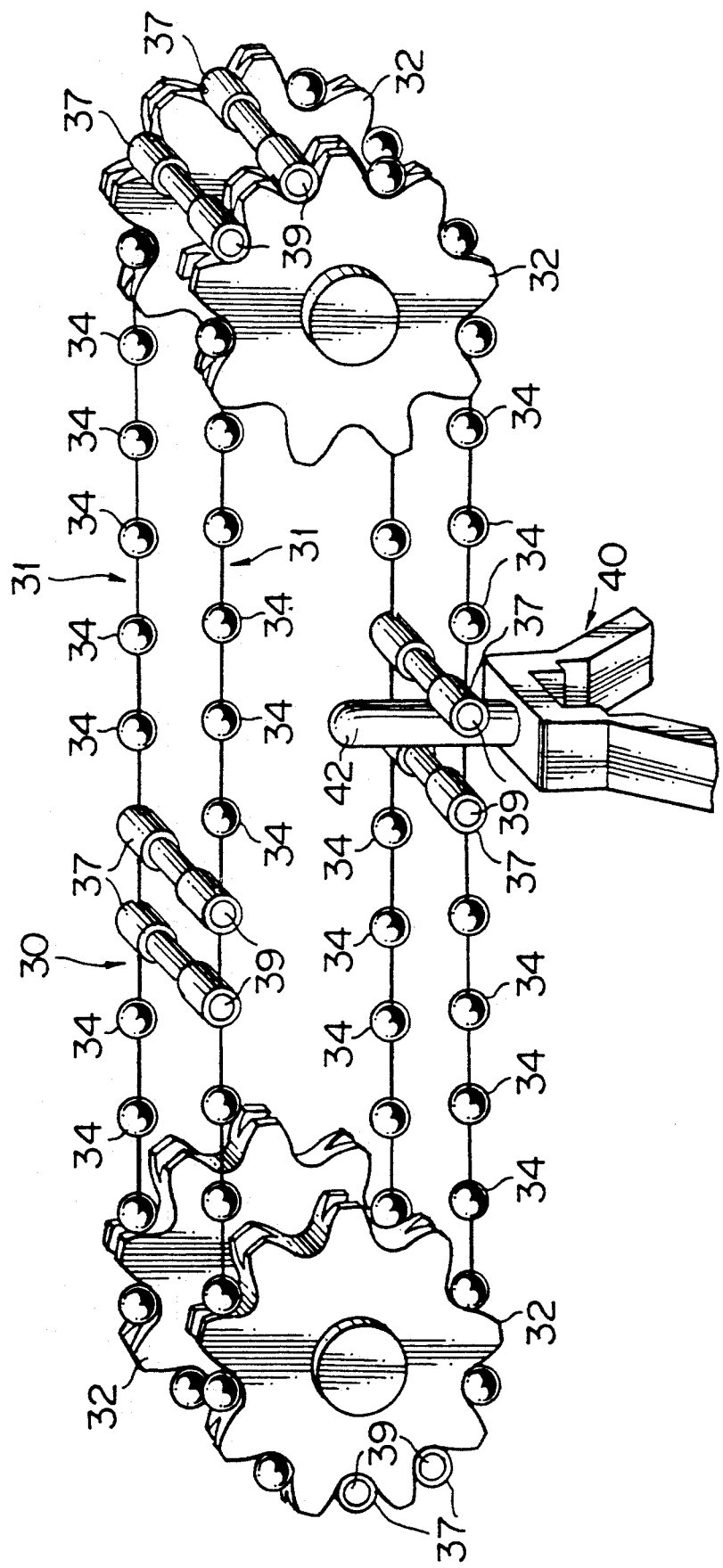
FIG. 5 is a perspective view showing another embodiment of the driving force transmission apparatus according to the present invention.

With reference to FIG. 5, another embodiment of the driving force transmission apparatus according to the present invention will be described.

FIG. 5 shows a driving force transmission apparatus 30 composed of two units each of which comprises a ball chain 31 with connection members 34 secured at an equal pitch thereon, and two sprockets 32 between which the ball chain 31 is stretched. Two connecting rods 37 are attached to adjacent caulking members 39 on the ball chains 31. The connecting rods 37 clamps a projection pin 42 of an extendible structure 40 to move the pin 42 with the rotation of the ball chains 31. According to the present embodiment, an object may be transferred with high precision in both rotational directions.

With reference to FIGS. 6A-9, an example of application of the driving force transmission apparatus 30 to a raising drive mechanism 60 of an extendible structure 40 will be described.

The extendible structure 40 of the present embodiment is a known assembly truss structure with an extendible and retractable structure in its longitudinal direction. Using the raising drive mechanism 60, a truss structure of a complete structure system may be consecutively assembled from the structure 40.

Figure 6B:
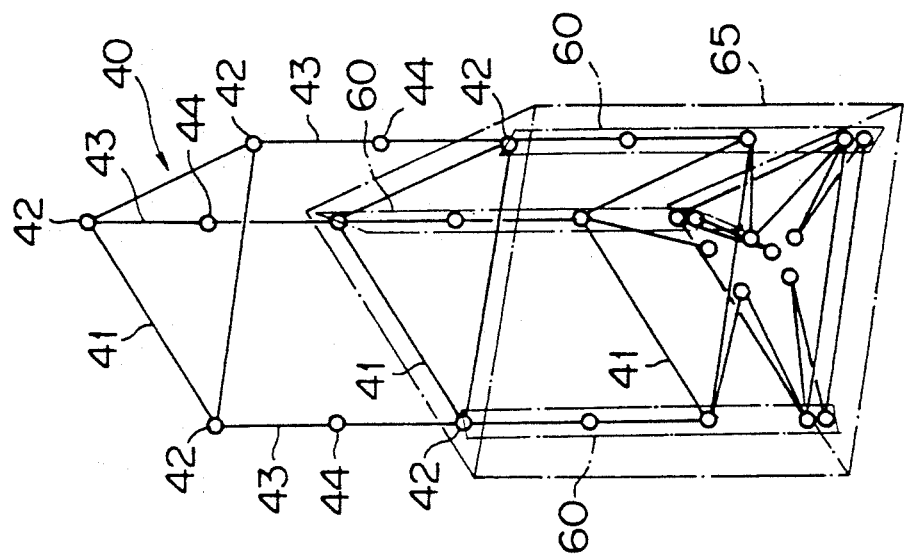
FIGS. 6A and 6B are a side view and a perspective view for a description of operation for an example of application of the driving force transmission apparatus as shown in FIG. 5 to a raising drive mechanism of an extendible structure.

The extendible structure 40 of the present embodiment has a truss structure of triangular pole which is an equilateral regular triangle in a plan view as shown in FIG. 6B. Triangular trusses 41 are connected by three poles 43 in the longitudinal direction of the triangular pole. Each of the poles 43 has a hinge 44 to be bent at a middle point. The extendible structure 40 can be stored in a canister 65 of the triangular pole in a stacked condition by bending the poles 43 inwards at the bending hinges 44. The truss structure of the triangular pole is completed by raising the poles 43 one by one.

The extension is operated as follows. Connecting rods 67 of the raising mechanism 60 are brought into contact with the pins 42 projecting at apexes of the triangular truss 41; and the connecting rods 67 are moved to simultaneously lift up the pins 42 at the apexes of triangular truss 41, extending the poles 43 of the extendible structure 40.

The operation of pins 42 is described below with reference to FIGS. 6A and 6B.

Figure 6A:
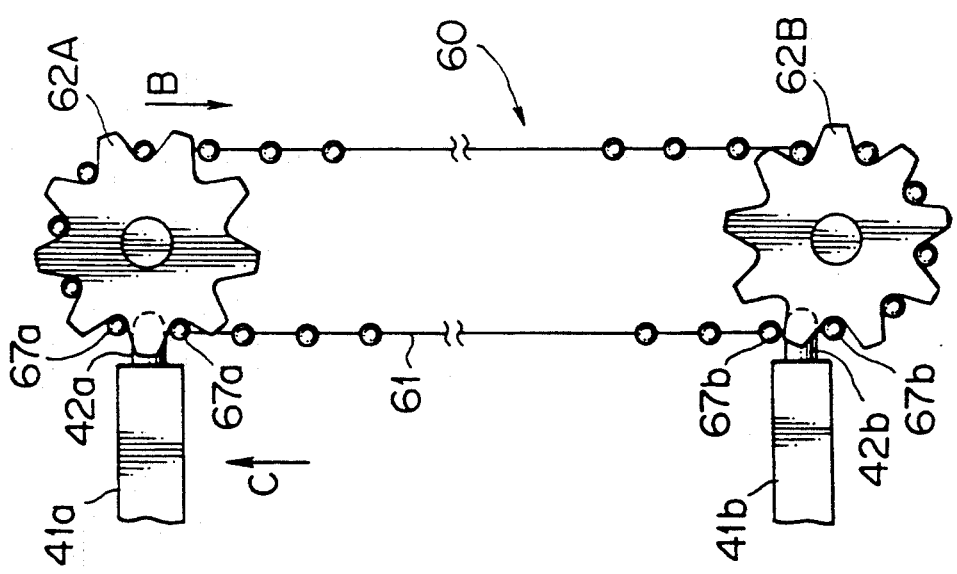

A first pin 42a, which is located at the top of extendible structure in the extension direction, is preliminarily loosely inserted in between the connecting rods 67a of the raising mechanism 60 as shown in FIG. 6A. The sprocket 62B is rotated by a motor (not shown) to rotate the ball chain 61 in the direction of arrow B. The fore end pin 42a moves in the direction of arrow C with rotation of the ball chain 61, and the next pin 42b approaches the ball chain 61 to be inserted in between the connecting rods 67b. The fore end pin 42a then leaves the connecting rod 67a with further motor driving. Before the pin 42a leaves the connecting rod 67a, the pole 43 is extended at the bending hinge 44 in the middle thereof to raise the truss structure from the canister 65 for complete construction. If it is desired to restore the extended truss structure into the canister 65, the reverse rotation of the sprockets 62A and 62B is effected.

The details of the structure of the raising drive mechanism 60 will be described below with reference to FIGS. 7A, 7B, and 8.

FIG. 7A is a sectional plan view of the raising drive mechanism 60. The same raising drive mechanism 60 is provided outside each apex of the triangular truss 41. The connecting rod 67 of the drive mechanism 60 connects to each pin 42 of the triangular truss 41 to raise the triangular truss 41. A sprocket 66 for synchronous rotation drive is connected through a universal joint 79 to the sprocket 62 for raising drive to synchronize the three raising drive mechanisms 60. A ball chain 68 for synchronous rotation is diagonally stretched between the two sprockets 66 of adjacent raising mechanisms 60 to rotate the raising drive sprockets 62 in the identical direction as shown in FIG. 7B. A sprocket 69 is disposed as a separator on the way of the ball chain 68 to prevent contact with itself at the crossing point upon rotation.

The sprockets 62, 66, 69 are preferably made of stainless steel. The sprockets are preferably made of a hard resin such as aramid resin known by its registered trademark "Kevlar" to decrease the weight thereof.

Figure 8:
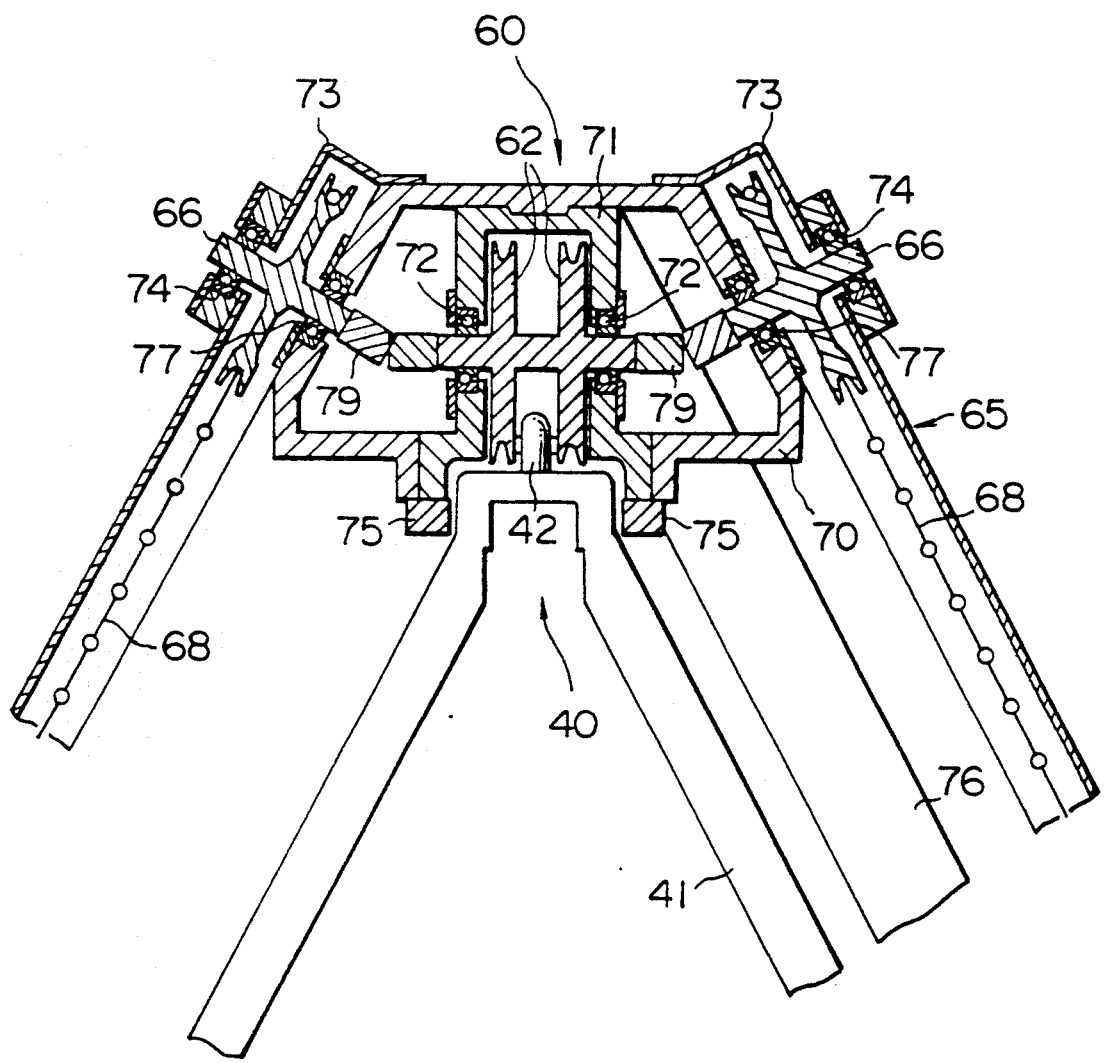
FIG. 8 is a partially enlarged view of the raising drive mechanism shown in FIG. 7.

The ball chains for raising drive are not shown in FIG. 8, but they are driven to rotate by the sprockets 62 for raising drive coaxially arranged in two columns. A support frame 70 is disposed outside each apex of the triangular truss 41 to rotatably support the sprocket 62 and to constitute the canister 65. A bearing frame 71 of cornered C-shape is provided inside the support frame 70. The sprocket 62 for raising drive is rotatably journaled through a bearing 72 mounted in the bearing frame 71. The above mentioned universal joints 79 are rotatably attached to the respective shaft ends of the rotation shaft of the sprocket 62. The sprocket 66 for synchronous rotation drive is supported by a bearing 77 of the support frame 70 and an another bearing 74 provided at the edge of the cover 73 of the canister 65, with connection with the universal joint 67. The ball chain 68 for synchronous rotation runs around the sprocket 66 to connect the raising driving mechanisms 60 at respective apexes.

Figure 9:
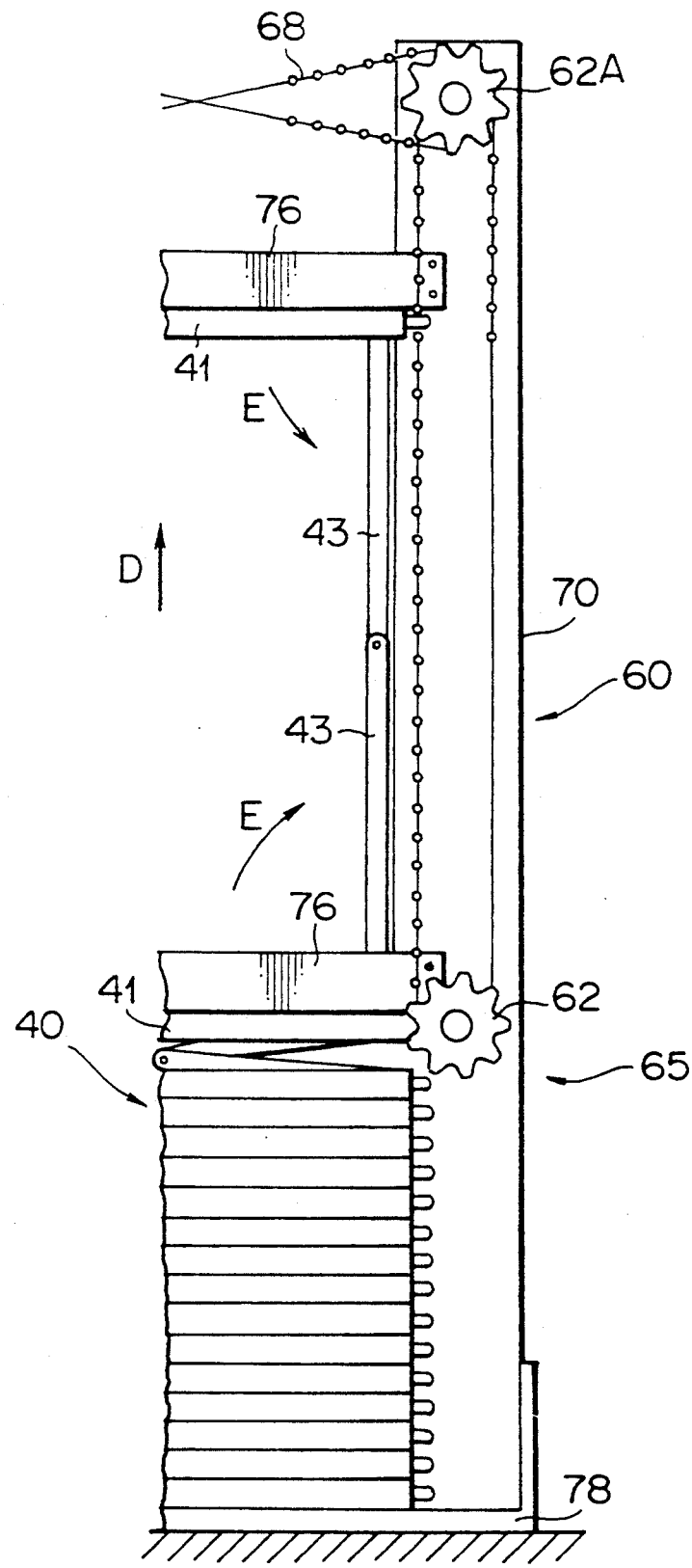
FIG. 9 is a partially sectional view to illustrate extension by the raising drive mechanism shown in FIG. 7.

A guide member 75 is secured to the support frame 70 near the triangle truss 41. The guide member 75 serves as guide for smooth raising of the extendible structure 40 and is made of a rubber-like material to prevent the extendible structure 40 from being scratched upon contact with a part thereof. Bridging frames 76 bridge the support frames 70 at respective apexes to fixedly hold the support frames 70 and to maintain the stiffness of the canister 65. FIG. 9 shows the relation between the raising drive mechanism 60 and the extendible structure 40 stored in the canister 65. Reference numeral 70 denotes the support frame standing on a base 78. The support frame 70 is reinforced by the bridging frames 76 located at a specific pitch as described above. The extendible structure 40 in a bent state is stored in the stacked condition in the canister 65. When the triangular truss 41 is moved in the direction of arrow D by the raising drive mechanisms 60, the poles 43 are extended in the direction of arrow E as shown in FIG. 9. The raising drive mechanisms 60 are synchronized to drive by the ball chains 68 for synchronous rotation stretched between the sprockets 62A for raising drive.

As will be apparent from the above description, the present invention provides a driving force transmission mechanism in a light and simple structure applicable in vacuum such as in a space environment, which has an advantage of effective mounting of an extendible structure onto a space structure.

What is claimed is:

1. A driving force transmission apparatus comprising at least two units, each of which comprises:
   an endless rope on which a plurality of connection members are secured at a specific pitch; and
   a pair of sprockets each having on the periphery thereof a guide groove for guiding said endless rope and recesses engageable with said connection members;
   wherein driving shafts and driven shafts of said at least two sprocket pairs are respectively coaxially located;
   a connecting rod is adapted to form a bridge between the endless ropes by securing two ends thereof to an opposed pair of said connection members respectively on said endless ropes; and
   said driving shafts of said sprocket pairs are rotated to cause a specific rotational reciprocating motion of said connecting rod.

2. The apparatus according to claim 1, wherein said connection members are substantially spherical.

3. The apparatus according to claim 2, wherein the each sprocket recess has a spherical bottom.

4. The apparatus according to claim 1, wherein said connecting rod has connection cylinders to receive said connection members to which the ends thereof are secured.

5. The apparatus according to claim 1, wherein said connecting rod has spherical ends, and said spherical ends serve as connection members.

6. The apparatus according to claim 1, wherein a pair of connecting rods are disposed adjacent to each other.

7. A method for producing a driving force transmission apparatus as set forth in claim 1, comprising:
   a provisional stop step including:
   running a rope with a predetermined tension through a plurality of caulking members each with a through hole;
   setting said rope and caulking members on a template having recesses formed thereon at a specific pitch; and
   provisionally stopping said caulking members on said rope while aligning caulking members with said recesses;
   a final stop step of further caulking said caulking members provisionally stopped, on said rope so as to form spherical shapes thereof; and
   a step of connecting the two ends of said rope by a caulking member to obtain an endless rope.

8. The method according to claim 7, wherein said recesses of said template are V-grooves.

9. The method according to claim 7, wherein said provisional stop step is simultaneous caulking of a plurality of caulking members.

10. The method according to claim 7, wherein said final stop step is individual caulkings of said caulking members provisionally caulked.

11. The method according to claim 7, wherein said caulking members constitute connection members after the final stop step.

12. The method according to claim 7, wherein said provisional caulking is carried out by pressing an upper template onto a lower template with each caulking member template onto a lower template with each caulking member interposed therebetween.

13. An extendible structure in which a structure assembly member stored in a specific bent condition is to be extended by a driving force transmission apparatus as set forth in claim 1 to construct a complete structure system.

14. The extendible structure according to claim 13, wherein said structure assembly member has a pin member to be connected to a connecting rod of the driving force transmission apparatus.

15. The extendible structure according to claim 13, wherein a plurality of driving force transmission apparatuses are synchronized to perform the extension of structure assembly member.

16. The extendible structure according to claim 15, wherein synchronizing means is provided for synchronized rotation of said plural driving force transmission apparatuses.

17. The extendible structure according to claim 13, wherein said complete structure system can be returned to the predetermined bent condition by reverse rotation of said driving force transmission apparatus.

* * * * *